(No Model.)

3 Sheets—Sheet 1.

J. W. PACKWOOD.
SAW SET.

No. 554,721.   Patented Feb. 18, 1896.

Witnesses
Robert Sollberger
Beatrice Charles

Inventor,
John W. Packwood,
By Drake & Co. Atty's.

(No Model.)  3 Sheets—Sheet 2.

J. W. PACKWOOD.
SAW SET.

No. 554,721.  Patented Feb. 18, 1896.

Witnesses  
Robert Sollberger  
Beatrice Charles.

Inventor  
John W. Packwood,  
By Baker & Co. Atty's.

(No Model.) 3 Sheets—Sheet 3.

J. W. PACKWOOD.
SAW SET.

No. 554,721. Patented Feb. 18, 1896.

Witnesses
Robert Sollberger
Beatrice Charles.

Inventor,
John W. Packwood,
By Drake & Co. Atty's.

UNITED STATES PATENT OFFICE.

JOHN W. PACKWOOD, OF NEWARK, NEW JERSEY.

SAW-SET.

SPECIFICATION forming part of Letters Patent No. 554,721, dated February 18, 1896.

Application filed February 11, 1895. Serial No. 537,885. (No model.)

*To all whom it may concern:*

Be it known that I, JOHN W. PACKWOOD, a citizen of the United States, residing at Newark, in the county of Essex and State of New Jersey, have invented certain new and useful Improvements in Saw-Sets; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to facilitate the operation of setting band-saws, circular and other saws, to secure uniformity in the set of the teeth, as well as other advantages hereinafter referred to.

The invention consists in the improved saw-set and in the combination and arrangement of the parts thereof, as hereinafter set forth, and finally pointed out in the claim.

Figure 1:
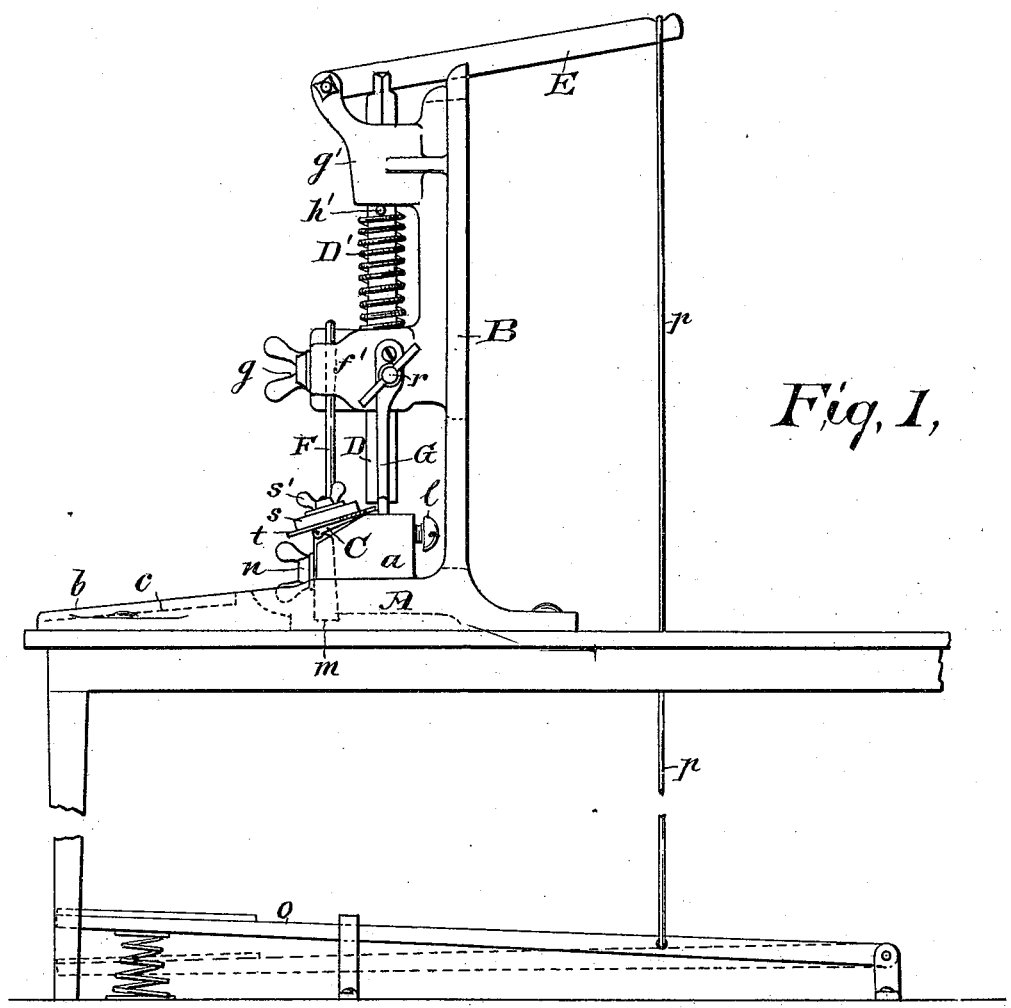
Figure 2:
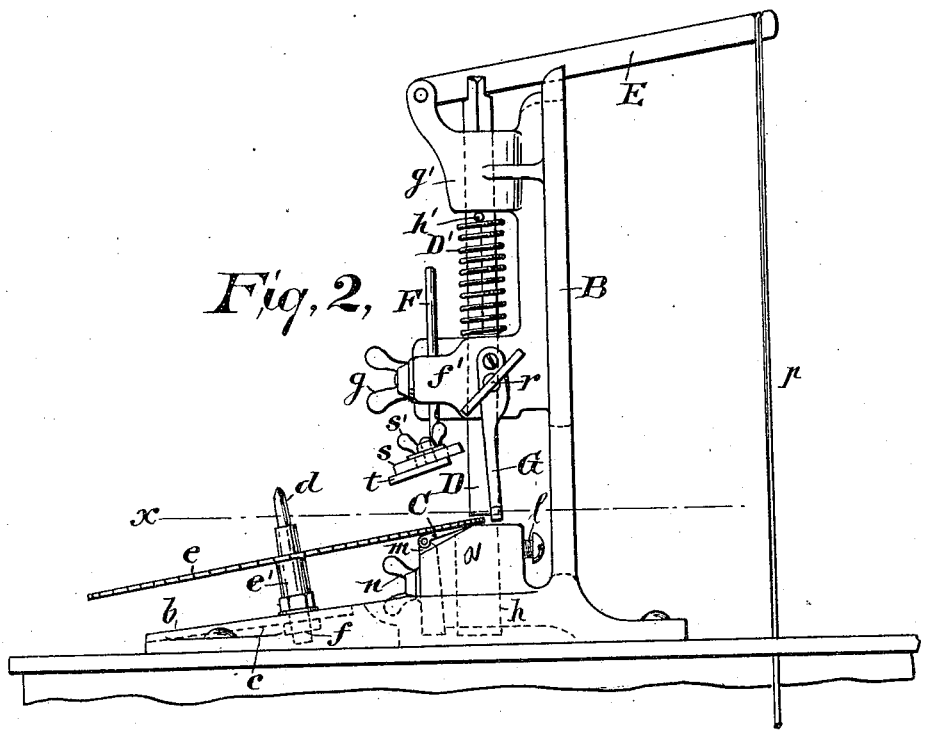
Figure 3:
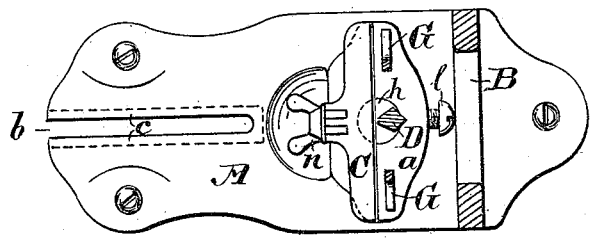
Figure 4:
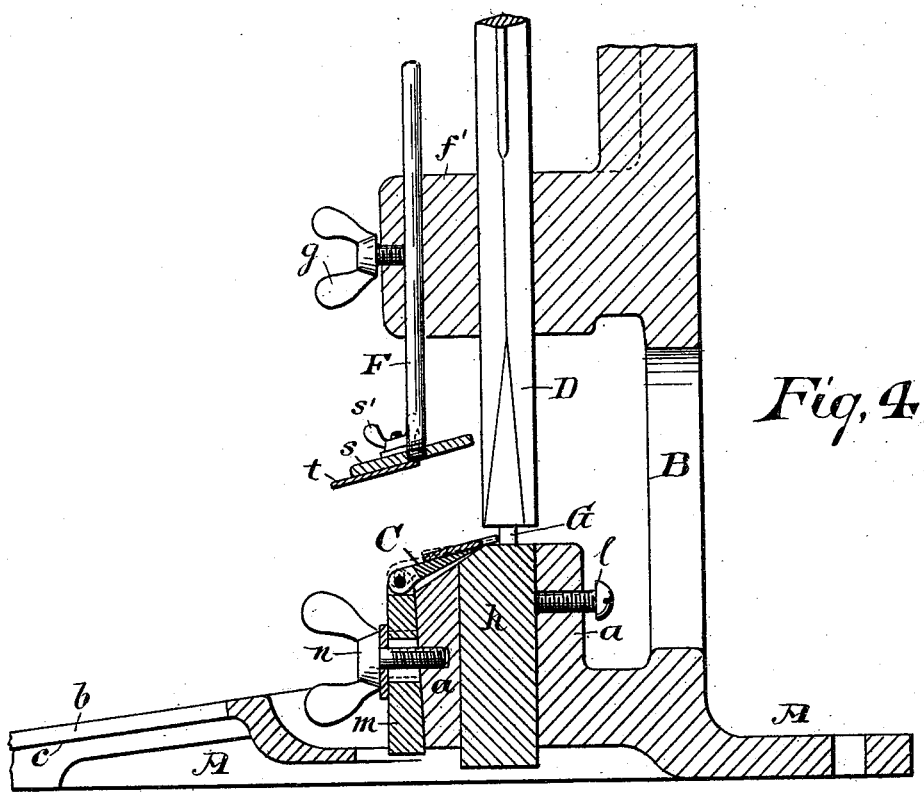
Figure 5:
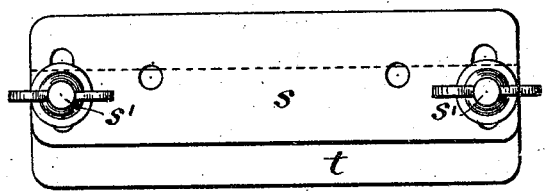

Referring to the accompanying drawings, in which similar letters of reference indicate corresponding parts in each of the several views where they occur, Figure 1 represents, in side elevation, a saw-set embodying my improvements with a band-saw adjusted therein in position to be operated upon. Fig. 2 is a similar view showing a circular saw in position and a certain adjustable mandrel or carrier upon which said saw is adjusted. Fig. 3 is a horizontal transverse section through line $x$ of said Fig. 2. Fig. 4 is a vertical transverse section of said saw-set, the upper part being broken off, illustrating more clearly the relation of the parts with one another and showing certain of said parts in elevation; and Fig. 5 is a plan view of an adjustable clamp used in connection with said saw-set when setting band-saws.

In said drawings, A B designate the base and upright portions, respectively, of a casting which carries the working parts of the machine. The top of said base A is preferably inclined from the anvil-block $a$ to the outer extremity thereof, being highest next to said anvil-block, and is provided with a slot $b$, which is cut under at the bottom to form shoulders $c$ thereat, in which slot is arranged an adjustable mandrel or rest $d$, upon which may be placed a circular saw $e$, which is supported thereon at the proper or desired incline, as plainly indicated in Fig. 2. Said mandrel is adjusted and held in any desired position or incline by a nut $f$, which is screwed upon the threaded end of said mandrel and engages upon each side with the undercut shoulders above referred to, the incline of the mandrel being increased or diminished by a simple tapered washer $e'$, as will be readily understood, in order that the required set may be given to the saw-teeth. The anvil-block $a$ forms a raised portion of said base and carries the anvil $h$, which is made of tempered steel, and is adjusted in a suitable recess in said raised portion or anvil-block. The front of the anvil and raised portion are tapered off in front, and the top thereof is substantially level, as plainly seen in the drawings. The said anvil $h$ is held in position by means of a set-screw $l$, which permits the anvil to be removed when necessary for repairs or for other purposes and readjusted.

C designates an adjustable rest pivotally connected to an adjustable carrier $m$, which works vertically in a recess formed in the front of the raised portion or anvil-block $a$, and is held therein at any required elevation by means of a set-screw $n$. Said rest is brought to a knife edge at the rear, where it rests upon the anvil-block, and the front portion can be raised or lowered at pleasure to vary the front incline of the rest and afford a wide bearing for the saws to rest upon, as will be readily understood by reference to the drawings.

D designates a plunger by which the set is given to the saw-teeth, said plunger being mounted and working in projecting parts $f'$ $g'$, carried by the upright portions B of the frame, and is normally held out of contact with the anvil or saw-teeth by means of a spring D', coiled around said plunger, with one end resting upon the projecting part $f'$ and the other end against a pin $h'$, passing through the said plunger at a suitable point toward the top thereof, which also limits the upward movement of said plunger, as will be understood. Said plunger at the bottom is tapered from the central portions thereof to a sharp corner at one side, and on the opposite to a sharp corner also, but at a varying angle, the object of which is to enable the plunger to be reversed in its sockets to accommodate itself to saw-teeth of different sizes—that is, to coarser and finer saws—as will be understood. The upper end of said plunger is bifurcated, and in order to give set to the teeth it is worked by means of a lever E, said lever being fulcrumed upon the upper projecting portion $g'$, and worked by means of a treadle $o$ and connecting rod or cord $p$, as indicated in the drawings and as will be readily understood.

F F designate two clamp bars or rods, only one of which is shown, which are carried by the projecting portion $f'$, and are vertically adjustable therein, being held in adjustment at any desired point by set-screws $g$. Said clamping-bars are intended to engage with the upper surface of a saw and hold it between said clamping-bars and the anvil at whatever angle is desired.

G G designate adjustable guide-bars, which are also carried by said projecting portion $f'$, and are held into adjustment also by set-screws $r$ against the top of the anvil-block and the ends of the teeth of a band-saw, said guide-bars being set either front or rear, according to the depth of the teeth, to hold the latter in proper position, the top of the band-saw engaging with an adjustable clamping and guide plate $s\,t$, carried by the said clamping-bars F, so that the band-saw will have no movement except longitudinally between said guide-bars and clamping-plate, the latter being capable of adjustment to accommodate the different widths of saws, as will be readily understood. Said clamping-plate being held upon said clamping-bars by being screwed to the latter, as will be understood, when setting other than band-saws, said clamping and guide plates $s\,t$ may, if desired and preferred, be readily removed, as will be understood. The two clamping-plates are held at a desired adjustment with relation to one another by means of set-screws $s'$, as indicated in Figs. 1, 2, 4, and 5, or by other appropriate means.

Having thus described my invention, what I claim as new is—

In a saw-set, the combination, with a base, provided with an upright and a vertically recessed portion forming an anvil-block, the front of which is tapered or inclined, an anvil in the block, the top of which is tapered in front to correspond with the block, a slotted carrier adjustably secured to the block by means of a set-screw through the slot, a rest pivotally secured to the carrier at one end and having its opposite end brought to a knife edge, and lying upon the tapered portions of the block and the anvil, an adjustable support in front of the block, an adjustable guide-plate above the rest, a plunger above the anvil, and guide-bars to the rear of the plunger and the anvil, substantially as set forth.

In testimony that I claim the foregoing I have hereunto set my hand this 6th day of February, 1895.

JOHN W. PACKWOOD.

Witnesses:
OLIVER DRAKE,
BEATRICE CHARLES.